US011979003B2

(12) United States Patent
Nufer et al.

(10) Patent No.: US 11,979,003 B2
(45) Date of Patent: May 7, 2024

(54) SPARK PLUG HOUSING HAVING A GALVANIC NICKEL AND ZINC-CONTAINING PROTECTIVE LAYER AND A SILICON-CONTAINING SEALING LAYER, SPARK PLUG HAVING SAID HOUSING, AND METHOD FOR PRODUCING SAID HOUSING

(71) Applicant: Robert Bosch GmbH, Stuttgart (DE)

(72) Inventors: Stefan Nufer, Stuttgart (DE); Tina Hirte, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 17/436,522

(22) PCT Filed: Mar. 18, 2020

(86) PCT No.: PCT/EP2020/057388
§ 371 (c)(1),
(2) Date: Sep. 3, 2021

(87) PCT Pub. No.: WO2020/187966
PCT Pub. Date: Sep. 24, 2020

(65) Prior Publication Data
US 2022/0181852 A1 Jun. 9, 2022

(30) Foreign Application Priority Data
Mar. 20, 2019 (DE) ..................... 10 2019 203 803.4

(51) Int. Cl.
*H01T 13/06* (2006.01)
*C25D 3/56* (2006.01)
(Continued)

(52) U.S. Cl.
CPC ............. *H01T 13/06* (2013.01); *C25D 3/562* (2013.01); *C25D 7/003* (2013.01); *H01T 21/02* (2013.01)

(58) Field of Classification Search
CPC ................................ H01T 13/08; H01T 13/06
See application file for complete search history.

(56) References Cited

U.S. PATENT DOCUMENTS

2003/0184201 A1* 10/2003 Roessler ................. H01T 13/20 313/118
2011/0006674 A1* 1/2011 Naaman .................... G03F 7/40 313/542

(Continued)

FOREIGN PATENT DOCUMENTS

DE 102 05 751 A1 8/2003
DE 11 2011 104 036 T5 10/2013

(Continued)

OTHER PUBLICATIONS

International Search Report corresponding to PCT Application No. PCT/EP2020/057388, dated Jun. 22, 2020 (German and English language document) (5 pages).

*Primary Examiner* — Andrew J Coughlin
(74) *Attorney, Agent, or Firm* — Maginot, Moore & Beck LLP

(57) ABSTRACT

The disclosure relates to a housing for a spark plug, having a bore along the longitudinal axis X of the housing, the housing comprises an outer side and an inner side and a galvanically applied nickel and zinc-containing protective layer is arranged on at least one part of the outer side of the housing. A sealing layer, which contains silicon, is arranged on the nickel and zinc-containing protective layer.

19 Claims, 3 Drawing Sheets

(51) Int. Cl.

| | |
|---|---|
| ***C25D 7/00*** | (2006.01) |
| ***H01T 21/02*** | (2006.01) |

(56) References Cited

U.S. PATENT DOCUMENTS

| | | | | |
|---|---|---|---|---|
| 2015/0372457 | A1* | 12/2015 | Shimamura ............. | H01T 13/08<br>313/143 |
| 2016/0365706 | A1* | 12/2016 | Bowman ................. | H01T 21/00 |
| 2018/0100244 | A1 | 4/2018 | Shibao et al. | |
| 2018/0323583 | A1* | 11/2018 | Niessner ................. | H01T 21/02 |
| 2022/0181852 | A1* | 6/2022 | Nufer, Sr. ............... | H01T 13/39 |

FOREIGN PATENT DOCUMENTS

| | | | |
|---|---|---|---|
| DE | 10 2016 110 880 | A1 | 12/2016 |
| EP | 1 484 432 | A1 | 12/2004 |
| EP | 2 546 938 | A1 | 1/2013 |
| EP | 2 605 348 | A1 | 6/2013 |
| JP | H2-152184 | A | 6/1990 |
| JP | 2003-105555 | A | 4/2003 |

* cited by examiner

SPARK PLUG HOUSING HAVING A GALVANIC NICKEL AND ZINC-CONTAINING PROTECTIVE LAYER AND A SILICON-CONTAINING SEALING LAYER, SPARK PLUG HAVING SAID HOUSING, AND METHOD FOR PRODUCING SAID HOUSING

This application is a 35 U.S.C. § 371 National Stage Application of PCT/EP2020/057388, filed on Mar. 18, 2020, which claims the benefit of priority to Serial No. DE 10 2019 203 803.4, filed on Mar. 20, 2019 in Germany, the disclosures of which are incorporated herein by reference in their entirety.

BACKGROUND

The disclosure relates to a housing for a spark plug and to a spark plug having at least one such housing as disclosed herein, and also to a method for producing the housing as disclosed herein.

Modern spark plugs have a housing composed of a steel which is subject to corrosion, more particularly rusting, under the conditions prevailing within the engine. For some considerable time, therefore, the housing of the spark plug has been coated with a protective layer which is intended to provide the steel housing with protection from corrosion. Nickel-containing and/or zinc-containing protective layers are very commonly encountered. Nickel- and zinc-containing protective layers have greater corrosive and thermal resistance than pure zinc coatings and at the same time are more favorably priced than pure nickel coatings. Moreover, the corrosion protection afforded by the nickel- and zinc-containing protective layer is diminished by defects in the protective layer. These defects may range from the surface of the nickel- and zinc-containing protective layer through to the surface of the housing and may therefore act as attack pathways for corrosion on the housing itself.

It is known from EP 2 546 938 A1 and EP 2 605 348 A1, for example, that, in the case of nickel-containing protective layers, this problem can be minimized by applying a chromium-containing sealing layer to the nickel-containing protective layer and thereby sealing the defects.

A chromium-containing sealing layer may be deposited on the housing surface from a CrVI-containing medium, for example. In that case, a sealing layer with bound trivalent chromium is formed. Depending on ambient conditions, however, it is possible for trivalent chromium actually bound on the surface to be converted by the sealing layer surface into free hexavalent chromium. The problem here is that hexavalent chromium is classed as a health hazard and, in certain countries, its use is prohibited.

SUMMARY

It is an object of the present disclosure to provide a housing for a spark plug having a corrosion control layer system which affords effective protection from corrosion and at the same time avoids very largely the use of a Cr-containing sealing layer. The corrosion control layer system ought in particular to have a temperature stability of 300° C. as well.

This object is achieved by a housing according to the disclosure for a spark plug in that the sealing layer disposed on a nickel- and zinc-containing protective layer comprises silicon. An advantage of using a silicon-containing sealing layer is that a chromium-containing sealing layer can be omitted and therefore the risk is prevented of hexavalent chromium forming and departing the sealing layer. Sealing layers based on silicon, moreover, have proven to be very temperature-stable. Specifically, in test series for spark plug housings comprising a corrosion control layer system composed of a nickel-containing protective layer and a silicon-containing sealing layer, it has been shown that these housings still have a rust level of 0 after 24 hours in the salt spray test, meaning that the housing exhibits no rust sites in the regions of the housing where a corrosion control layer has been applied. Even after storage of the housings at 300° C. for 3 hours, the housings still have a rust level of 0 after 24 hours in the salt spray test.

The housing for a spark plug has a bore along its longitudinal axis. By virtue of this bore, the housing acquires an outer side and an inner side. The bore in the housing is typically intended to accommodate an insulator with a central electrode and connection means. The housing is typically composed of a steel, such as carbon steel, for example. Applied on at least part of the outer side, on the surface of the housing, is a protective layer intended to provide the housing with protection from corrosion. The protective layer is a nickel- and zinc-containing protective layer which is applied to the housing by means of electroplating. In electroplating, the housing is immersed as anode, together with an electrode serving as cathode, into an electrolyte bath containing nickel and zinc. The application of a voltage between housing and electrode causes a current to flow from the coating electrode through the electrolyte to the housing, and this causes a nickel- and zinc-containing protective layer to deposit on the side of the housing facing the coating electrode. The protective layer consists substantially of nickel and zinc. In this case, the nickel fraction in the protective layer is preferably 12 to 15 wt %. In that case, the protective layer has a thermal resistance up to around 500° C. If the nickel content is lower, the thermal resistance is lower. If the nickel content is higher, the zinc is not adequately stabilized and corrosive exposure causes dezincification of the protective layer. This means that the zinc is increasingly degraded within the protective layer, through oxidation of the zinc in the protective layer, for example. The protective layer loses its corrosion control effect. Iron from the coating electrode is likewise deposited at the housing together with the nickel and the zinc. The fraction of iron in the nickel- and zinc-containing protective layer is typically 2 to 6 wt %. Further impurities are possible in the nickel- and zinc-containing protective layer, such as sulfur and traces of sodium or potassium, for example.

The nickel- and zinc-containing protective layer on the housing serves for cathodic corrosion control: in other words, the nickel- and zinc-containing protective layer is electrochemically more noble than the material of the housing and forms a barrier layer against wet media. The corrosion control afforded by the nickel- and zinc-containing protective layer is dependent on the layer thickness B of the nickel- and zinc-containing protective layer and on the extent to which this layer is free from defects. The thicker the nickel- and zinc-containing protective layer, the less likely it is that a defect will extend from the surface of the nickel- and zinc-containing protective layer through the entire thickness of the nickel- and zinc-containing protective layer to the surface of the housing and will thereby open up an attack pathway for corrosion processes on the housing. By means of an additional sealing layer on the nickel- and zinc-containing protective layer, these defects are closed off and the corrosion control for the housing is improved.

Further advantageous embodiments are subjects of the disclosure.

In one advantageous embodiment, it is provided that the sealing layer is free from chromium, meaning that the sealing layer contains no deliberately added chromium and contains chromium at most in an amount of technically unavoidable impurities which, for example, are incorporated unintentionally into the sealing layer during the production process.

It has emerged as being advantageous if the sealing layer has a layer thickness A of not below 10 nm and not more than 10 μm, more particularly of not below 100 nm and/or not more than 1 μm. It has emerged that the sealing layer ought to have a layer thickness A of not less than 10 nm, so that the sealing layer is sufficiently thick to close off the defects in the nickel- and zinc-containing protective layer. It has emerged, furthermore, that, for layer thicknesses A of the sealing layer of more than 10 μm, there is no substantial improvement in the above-described technical effects of the sealing layer.

Additionally or alternatively, the layer thickness B of the nickel- and zinc-containing protective layer is in a range from 1 μm to 30 μm.

In one development of the disclosure, a first interlayer is applied between the housing and the nickel- and zinc-containing protective layer and/or a second interlayer is applied between the nickel- and zinc-containing protective layer and the sealing layer and/or an outer layer is applied on the sealing layer.

An advantage of the first interlayer is that the nickel- and zinc-containing protective layer adheres more effectively on the housing. The first interlayer serves as a tie attachment layer and may consist, for example, of copper or nickel strike.

An advantage of the second interlayer is that the silicon-containing sealing layer adheres more effectively on the nickel- and zinc-containing protective layer and that thermal stresses between the layers are reduced. The second interlayer serves as a tie attachment layer and may comprise, for example, at least one of the following elements: nickel, copper, chromium, zinc or titanium.

The outer layer on the silicon-containing sealing layer serves to protect the sealing layer from mechanical damage and may comprise, for example, at least one the following elements: nickel, copper, zinc, chromium or titanium.

Additionally or alternatively, the first interlayer has a layer thickness C of 1 nm to 1000 nm and/or the second interlayer has a layer thickness D of 1 nm to 1000 nm and/or the outer layer has a layer thickness E of 1 nm to 2000 nm. It is advantageous if the layer thicknesses of the interlayer and of the outer layer are substantially less thick than the nickel- and zinc-containing protective layer, with this preventing internal stresses from occurring in the interlayers and the outer layer. Because of internal stresses in a layer, there may be tie attachment faults or detachment of the layer from another layer, such as the nickel- and zinc-containing protective layer or the sealing layer, for example.

The advantageous effects of the corrosion control layer system comprising a nickel- and zinc-containing protective layer and a sealing layer and, optionally, the first interlayer and/or the second interlayer and/or the outer layer come about in particular if the nickel- and zinc-containing protective layer and the sealing layer and also the optional first interlayer and/or the optional second interlayer and/or the optional outer layer are formed on the entire outer side of the housing. And the corrosion control layer system in particular is/are additionally formed on at least part of the inner side of the housing as well. It is particularly advantageous if the nickel- and zinc-containing protective layer and the sealing layer and also the optional first interlayer and/or the optional second interlayer and/or the optional outer layer is/are formed on the entire surface of the housing. The greater the surface area of the housing that is covered with the corrosion control layer system, the smaller the exposed housing surface which is susceptible to corrosion processes.

The disclosure also relates to a spark plug, comprising a housing according to the disclosure, an insulator disposed in the housing, a central electrode disposed in the insulator, and a ground electrode disclosed on the combustion chamber-side end of the housing, where the ground electrode and the central electrode are configured to constitute a spark gap together.

The disclosure, furthermore, also relates to the method for producing a housing according to the disclosure. In this case, the production method comprises the following steps:

- providing a housing for a spark plug having a nickel- and zinc-containing protective layer applied to the housing by means of an electrochemical coating process, where the housing optionally comprises a first and/or second interlayer,
- subsequently washing the housing coated with at least the nickel- and zinc-containing protective layer,
- subsequently a step in which a sealing layer is applied to the nickel- and zinc-containing protective layer or the second interlayer.

The production method may optionally also comprise, before the washing step, a cleaning step, in which the surface of the housing coated with at least the nickel- and zinc-containing protective layer is cleaned. The purpose of the cleaning step is to clean the surface of the housing and the surface of the nickel- and zinc-containing protective layer or of the optional second interlayer to remove, for example, particles, dirt, and passivating agent, and in particular to carry out hydrolyzation or activation of the surface for the attachment of the silane solution.

In the washing step, the housing coated with at least the nickel- and zinc-containing protective layer is freed of cleaning agent and/or residues thereof. Or, if a separate cleaning step is omitted, coarse contaminants as well, such as dust, for example, are then washed off during the washing step.

In the sealing layer application step, the sealing layer is applied at least to the nickel- and zinc-containing protective layer or to the second interlayer.

The sealing layer is preferably a silicon-containing sealing layer, and the silicon-containing sealing layer is formed by silanization of the housing surface coated with at least the nickel- and zinc-containing protective layer. Silanization is a chemical attachment of a silane compound to a surface. Attachment is accomplished by condensation reaction between hydrolyzable groups of the silanes used and chemical groups on the surface. The silanes used for the silanization typically have the general form $R_mSiX_n$, where R stands for organic-functionalized radicals and X stands for hydrolyzable groups, with m and n standing for the number of organic-functionalized radicals and of hydrolyzable groups.

In one advantageous onward development, the method comprises at least one drying step, in which the water or a solvent is removed from the surface of the coated and sealed housing. In the course of this step, for example, the silane compounds already begin to crosslink. Furthermore, the production method may also comprise a polycondensation step for curing the sealing layer. In the curing of silane compounds, the crosslinking of the silane compounds is concluded and the crosslinking undergoes consolidation, to form a firm and robust sealing layer.

Additionally or alternatively, the production method may also comprise a step in which an outer layer is applied to the sealing layer. This protects the sealing layer from mechanical damage.

The preferred silanization may comprise, for example, the polycondensation both of silane compounds with one another, which are coupled on the surface of the second interlayer or on the surface of the nickel- and zinc-containing protective layer of the housing, and of silane compounds coupled on the surface of the second interlayer or to the surface of the nickel- and zinc-containing protective layer of the housing with noncoupled silane compounds.

In principle it is also possible for further silicone compounds, such as silicone oils (e.g., diorganopolysiloxanes), for example, to be incorporated into the network of silane compounds that is formed by the polycondensation.

In one advantageous onward development of the production method, the sealing layer is applied using as coating technique a sol-gel operation, CCVD or PVD.

In the case of the sol-gel operation, the housing is placed into a silane solution. During the silanization, the silanes accumulate on the surface of the housing coated with at least the nickel- and zinc-containing protective layer, where they begin to crosslink with one another and to form the sealing layer.

In the case of the CCVD technique (combustion chemical vapor deposition), also called flame coating, a starting compound suitable for generating the desired layer—in this case the silanes—is added to a combustion gas. The flame is moved at a small distance over the substrate to be coated—in this case, the housing coated with the nickel—and zinc-containing protective layer. As a result of the high combustion energy, the starting compounds form very reactive species, which connect firmly to the substrate surface. The thermal load on the substrate itself is low, since it comes into contact with the flame only briefly.

In the case of the PVD technique (physical vapor deposition), the material to be deposited—in this case the silanes—is present in solid form in a coating chamber. The material is caused to evaporate by bombardment with laser beams, ions, electrodes or arc discharge. The evaporated material moves through the coating chamber onto the parts to be coated—in this case, the housing coated with at least the nickel—and zinc-containing protective layer—and condenses there and so forms the protective layer.

It has emerged as being advantageous to use silanes with functionalization for producing the silicon-containing sealing layer, more particularly alkoxysilanes, aminosilanes or acrylosilanes. In addition, it is also possible to use silanes without functionalization, more particularly alkyltrialkoxysilanes, for the silane-containing sealing layer. Partly fluorinated or perfluorinated siloxanes are only of limited usefulness, since layers formed from them do not exhibit temperature stability up to 300° C.

Further features, possible applications, and advantages of the disclosure are apparent from the description below of working examples of the disclosure, which are illustrated in the figures of the drawing.

DETAILED DESCRIPTION

Figure 1:
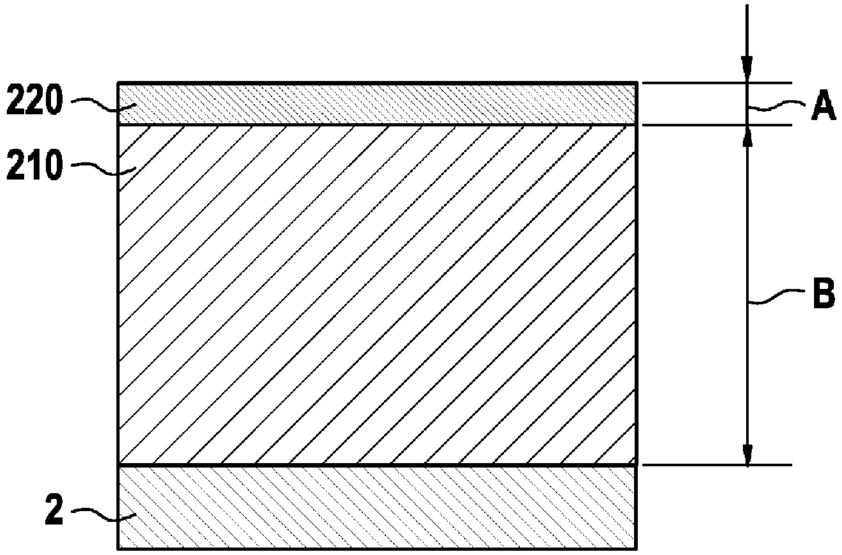
FIG. 1 shows an example of a corrosion control layer system according to the disclosure on a housing

FIG. 1 shows an example of a corrosion control layer system according to the disclosure, consisting of the nickel- and zinc-containing protective layer 210 and of the silicon-containing sealing layer 220. The nickel- and zinc-containing protective layer 210 is applied on the surface of a housing 2. Applied in turn to the nickel- and zinc-containing protective layer 210 is the silicon-containing sealing layer 220.

The nickel- and zinc-containing protective layer 210 has a layer thickness B. The layer thickness is measured perpendicularly to the housing surface. Since the nickel- and zinc-containing protective layer 210 is applied by means of electroplating on the housing 2, the layer thickness B of the nickel- and zinc-containing protective layer 210 may differ at different sites on the housing 2. On its inner side 204, for example, the housing 2 may have no nickel- and zinc-containing protective layer 210 or only partially a nickel- and zinc-containing protective layer. Preferably, the housing 2 has a nickel- and zinc-containing protective layer 210 on its entire outer side 205.

The silicon-containing sealing layer 220 has a layer thickness A. In the case of a silicon-containing sealing layer 220 applied by means of a dipping bath in a silane solution, the resulting silicone-containing sealing layer 220 generally has a very uniform layer thickness A. In particular, the silicon-containing sealing layer 220 may be formed on the entire surface of the housing 2, including at sites on the housing 2 at which there is no nickel- and zinc—containing protective layer 210, such as regions of the inner side 204 of the housing 2, for example.

Figure 2:
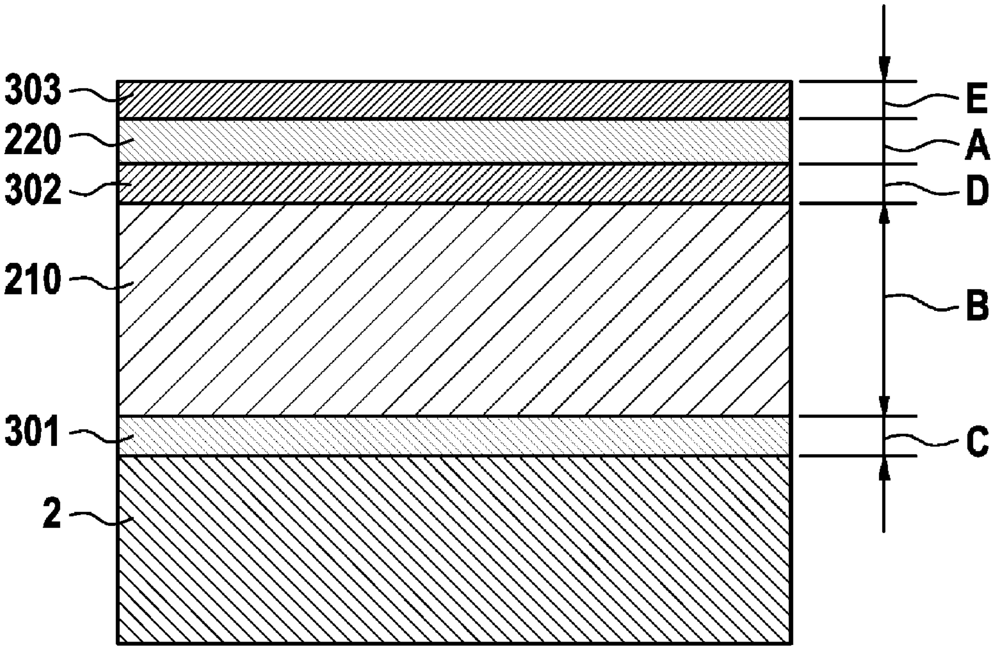
FIG. 2 shows a further example of a corrosion control layer system according to the disclosure on a housing

FIG. 2 shows a further example of a corrosion control layer system according to the disclosure, consisting of the nickel- and zinc-containing protective layer 210 and of the silicon-containing sealing layer 220 and also of the first interlayer 301 and the second interlayer 302 and the outer layer 303. Applied on the surface of a housing 2 is the first interlayer 301. Applied in turn on the latter is the nickel- and zinc-containing protective layer 210. The second interlayer 302 is disposed between the nickel- and zinc-containing protective layer 210 and the silicon-containing sealing layer 220. Applied in turn on the silicon-containing sealing layer 220 is the outer layer 303.

The nickel- and zinc-containing protective layer 210 has a layer thickness B. The first interlayer 301 has a layer thickness C and second interlayer 302 has a layer thickness D. The layer thicknesses are measured perpendicularly to the housing surface. If the nickel- and zinc-containing protective layer 210 is applied by means of electroplating on the housing 2, the layer thickness B of the nickel- and zinc-containing protective layer 210 may be different at different sites on the housing 2. On its inner side 204, for example, the housing 2 may have no nickel- and zinc—containing protective layer 210 or only partially a nickel- and zinc-containing protective layer 210.

The silicon-containing sealing layer 220 has a layer thickness A. In the case of the silicon-containing sealing layer 220 applied by means of a dipping bath in a silane solution, the resulting silicone-containing sealing layer 220 generally has a very uniform layer thickness A. In particular, the silicon-containing sealing layer 220 may be formed on the entire surface of the housing 2, including at sites on the housing 2 at which there is no nickel- and zinc—containing protective layer 210, such as regions of the inner side 204 of the housing 2, for example. The outer layer 303 has a layer thickness E.

In further embodiments of the housing 2 with the corrosion control layer system according to the disclosure, the corrosion control layer system, besides the nickel- and zinc-containing protective layer 210 and the sealing layer 220, may comprise only the outer layer 303 or only the first or second interlayer 301, 302, or the outer layer 303 in combination with the first or second interlayer 301, 302.

Figure 3:
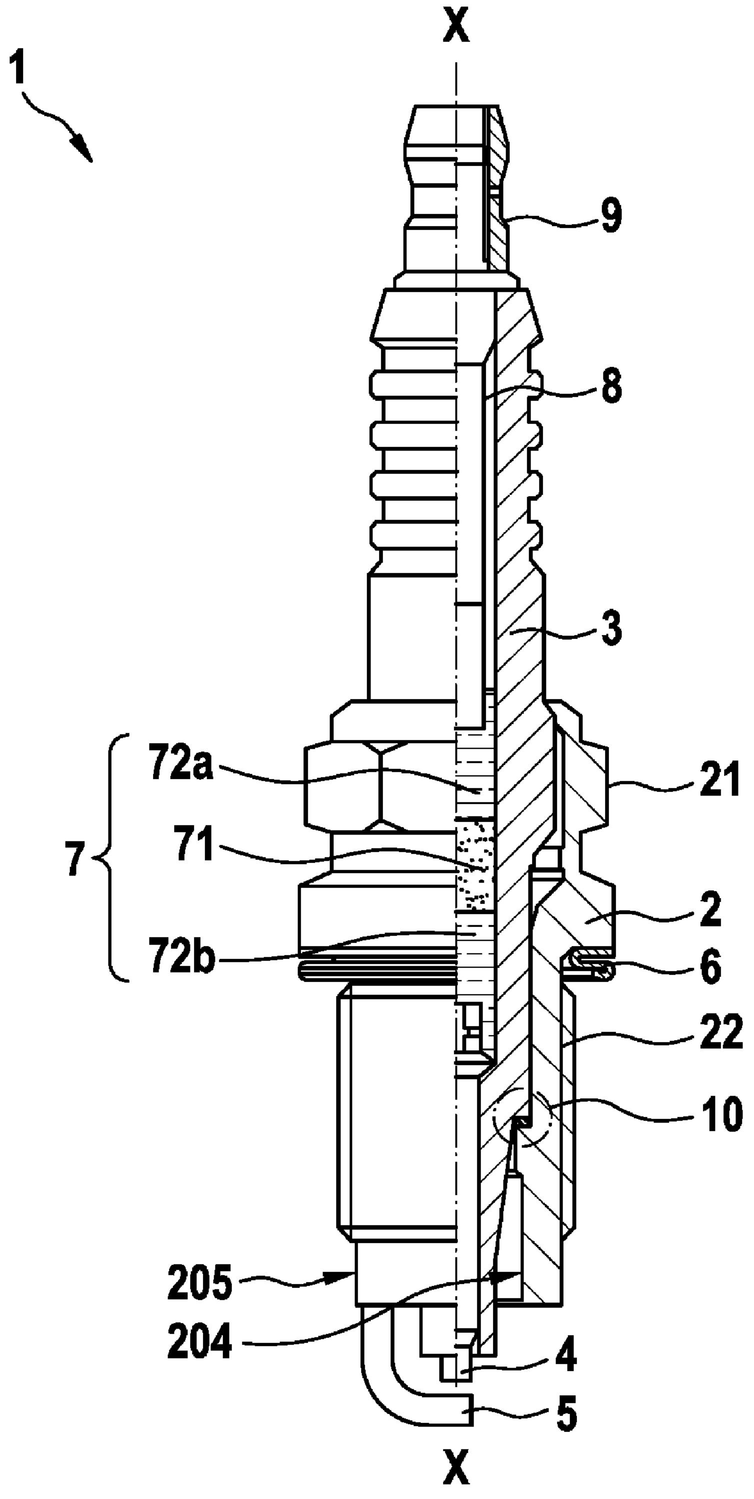
FIG. 3 shows an example of a spark plug with the housing according to the disclosure

FIG. 3 shows a spark plug 1 in a half-sectional view. The spark plug 1 comprises a housing 2. Inserted in the housing 2 is an insulator 3. The housing 2 and the insulator 3 each have a bore along their longitudinal axis X. As a result of the bore, the housing 2 has an outer side 205 and an inner side 204. The longitudinal axis of the housing 2, the longitudinal axis of the insulator 3 and the longitudinal axis of the spark plug 1 are coincident. Inserted in the insulator 3 is a central electrode 4. Furthermore, a connection bolt 8 extends into the insulator 3. Disposed on the connection bolt 8 is a connection nut 9, via which the spark plug 1 can be contacted electrically with a voltage source which is not shown here. The connection nut 9 forms the end of the spark plug 1 that faces away from the combustion chamber.

Located in the insulator 3, between the central electrode 4 and the connection bolt 8, is a resistance element 7, also called CCM (Ceramic Compound Material). The resistance element 7 provides an electrically conducting connection between the central electrode 4 and the connection bolt 8. The resistance element 7 is constructed, for example, as a layer system from a first contact-CCM 72*a*, a resistance—CCM 71 and a second contact-CCM 72*b*. The layers of the resistance element 7 differ in their physical composition and in the resulting electrical resistance. The first contact-CCM 72*a* and the second contact-CCM 72*b* may have a different electrical resistance or an identical electrical resistance. The resistance element 7 may also comprise only one layer of resistance-CCM or two or more different layers of resistance-CCM with different physical compositions and resistances.

A shoulder of the insulator 3 lies on a housing seat formed on the inner side of the housing. In order to seal off the air gap between the inner side of the housing and the insulator 3, an inner seal 10 is disposed between the insulator shoulder and the housing seat, and, when the insulator 3 is clamped in the housing 2, this inner seal 10 undergoes plastic deformation and so seals off the air gap.

Disposed in an electrically conducting manner on the housing 2, on its end face on the combustion chamber side, there is arranged a ground electrode 5. The ground electrode 5 and the central electrode 4 are arranged with respect to one another in such a way that a spark gap is formed between them, at which the ignition spark is generated.

The housing 2 has a shaft. A polygon 21, a shrink recess and a screw thread 22 are formed on this shaft. The screw thread 22 serves for screwing the spark plug 1 into an internal combustion engine. Disposed between the screw thread 22 and the polygon 21 is an outer sealing element 6. In this working example, the outer sealing element 6 is configured as a fold seal.

The housing 2 consists of a steel, such as carbon steel, for example. Applied on the housing 2, more particularly on its outer side, is a nickel- and zinc-containing protective layer 210. The nickel- and zinc-containing protective layer 210 has a layer thickness B, with B preferably being not less than 1 μm and not more than 30 μm. The nickel- and zinc-containing protective layer 210 serves as passive corrosion control. Also applied on the nickel- and zinc—containing protective layer 210 is a silicon-containing sealing layer 220. The silicon-containing sealing layer 220 has a layer thickness A, with A preferably being not less than 10 nm and not more than 1000 nm.

Figure 4:
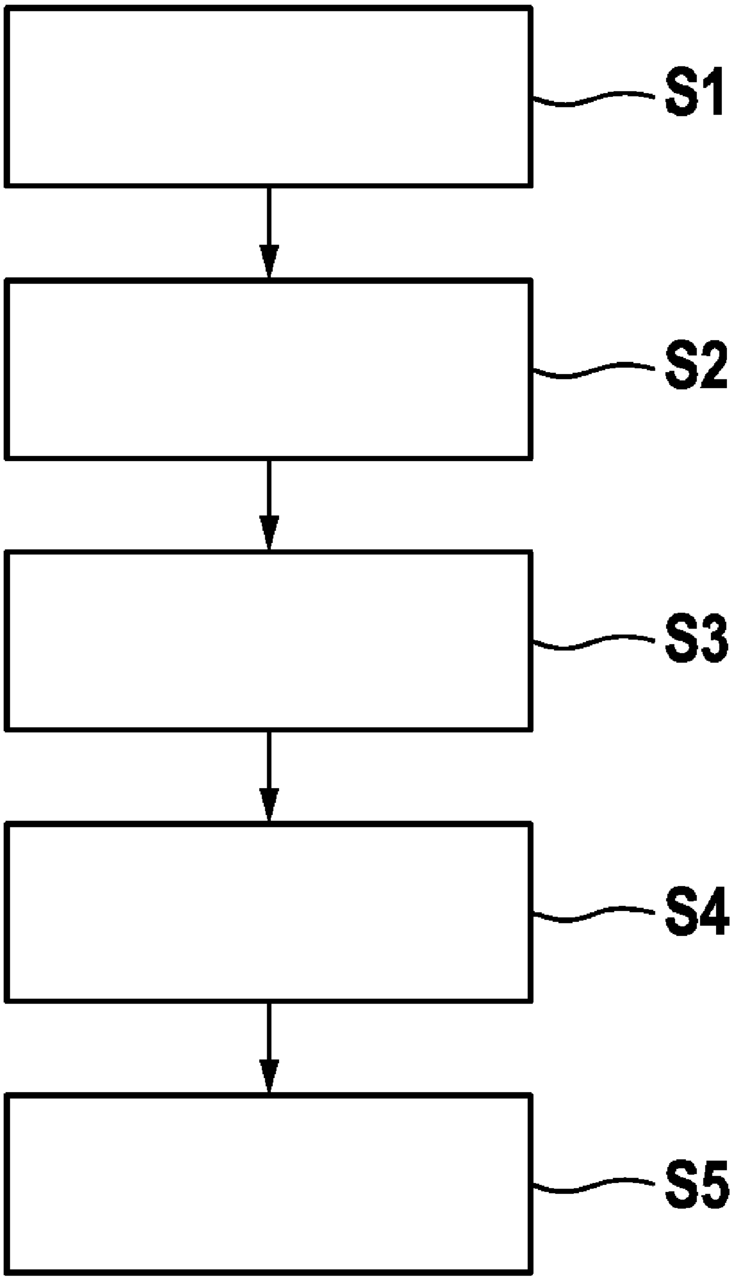
FIG. 4 shows illustratively the production method for a housing according to the disclosure

FIG. 4 shows, schematically, a detail of the illustrative sequence of the method for producing a housing 2 according to the disclosure:

In a first, optional step S1, the housing 2, which has been coated beforehand, by means of electroplating, with at least the nickel- and zinc-containing protective layer 210 and optionally with one or two interlayers, and its surface is cleaned. For this purpose, the housing 2 coated with at least the nickel- and zinc-containing protective layer 210 is placed into a bath containing a highly alkaline cleaner and is additionally bombarded with ultrasound in the bath for around 5 min. The optional cleaning step serves, on the one hand, for removing particles, dirt and passivating agent which hinder application of the sealing layer 220; on the other hand, the surface to which the sealing layer 220 is to be applied is hydrolyzed and/or activated, so that the sealing layer 220 has a good attachment possibility. Optionally, before the optional cleaning, the housing 2 may have not only the nickel- and zinc-containing protective layer 210 but also a first interlayer 301 and/or a second interlayer 302.

In the second step S2, the cleaned housing 2 is washed with demineralized water, for example, so that possible residues of cleaning agent are removed.

In the third step S3, the sealing layer 220 is applied. Application in this case may take place, for example, by silanization of the coated housing 2. In that case, the housing 2 is immersed into a silane solution or sprayed with a silane solution. In this step, the silane binds to the hydrolyzed surface of the housing 2 and begins to cross-link, causing the sealing layer 220 to form.

In the optional fourth step S4, the housing 2 is dried and the sealing layer 220 cures. In that case the housing 2, after the silanization, is placed, for example, into a drying oven at around 130° C. for around 15 min. Here, possible residues of water or residues of solvent, from the bath, for example, are removed from the sealing layer 220. At the same time, the crosslinking of the silanes with one another is concluded, causing the sealing layer 220 to cure. The drying step is particularly advantageous, since it supports and accelerates the crosslinking of the silanes with one another.

In the final step S5 shown here, the housing 2 cools before it is passed on for further processing operations, such as, for example, application of an outer layer 303 to the silicon-containing sealing layer 220, or assembly of the spark plug 1.

The invention claimed is:

1. A housing for a spark plug, the housing having an outer side and an inner side, comprising:
- a bore defined by the inner side and extending along a longitudinal axis of the housing;
- an electrochemically applied nickel- and zinc-containing protective layer disposed on at least part of the outer side of the housing; and
- a sealing layer disposed on the nickel- and zinc-containing protective layer, wherein the sealing layer comprises silicon and is formed by silanization.

2. The housing as claimed in claim 1, wherein the sealing layer is free from chromium.

3. The housing as claimed in claim 1, wherein the sealing layer has a layer thickness of 10 nm to 10 μm.

4. The housing as claimed in claim 3, wherein the sealing layer has a layer thickness of 100 nm to 1 μm.

5. The housing as claimed in claim 1, wherein the nickel- and zinc-containing protective layer has a layer thickness of 1 μm to 30 μm on the housing.

6. The housing as claimed in claim 1, wherein at least one of a first interlayer is applied between the housing and the nickel- and zinc-containing protective layer, a second interlayer is applied between the nickel- and zinc-containing protective layer and the sealing layer, and an outer layer is applied on the sealing layer.

7. The housing as claimed in claim 6, wherein:
the first interlayer is applied between the housing and the nickel- and zinc-containing protective layer; and
the first interlayer has a layer thickness of 1 nm to 1000 nm.

8. The housing as claimed in claim 6, wherein:
the second interlayer is applied between the nickel- and zinc-containing protective layer and the sealing layer; and
the second interlayer has a layer thickness of 1 nm to 1000 nm.

9. The housing as claimed in claim 6, wherein:
the outer layer is applied on the sealing layer; and
the outer layer has a layer thickness of 1 nm to 2000 nm.

10. The housing as claimed in claim 6, wherein:
the nickel- and zinc-containing protective layer and the sealing layer are formed on the entire outer side of the housing;
the nickel- and zinc-containing protective layer and the sealing layer are formed on at least part of the inner side of the housing; and
the at least one of the first interlayer, the second interlayer, and the outer layer are formed on the entire outer side of the housing, and on the at least part of the inner side of the housing.

11. A spark plug, comprising:
a housing as claimed in claim 1;
an insulator disposed in the housing;
a central electrode disposed in the insulator; and
a ground electrode disposed on a combustion chamber-side end of the housing, wherein the ground electrode and the central electrode are configured to constitute a spark gap.

12. A method for producing a housing as claimed in claim 1, comprising:
providing a housing for a spark plug having a nickel- and zinc-containing protective layer applied to the housing by means of an electrochemical coating process, and a second interlayer;
washing the provided housing coated with the nickel- and zinc-containing protective layer; and
forming a sealing layer on the washed nickel- and zinc-containing protective layer and the second interlayer by silanization.

13. The method for producing a housing as claimed in claim 12, further comprising:
cleaning a surface of the housing coated with at least the nickel- and zinc-containing protective layer before washing the provided housing.

14. The method for producing a housing as claimed in claim 12, further comprising:
drying the housing after forming the sealing layer to remove at least one of water and solvents from the application of the sealing layer from a surface of the housing.

15. The method for producing a housing as claimed in claim 14, further comprising:
curing the sealing layer during polycondensation and after drying the housing.

16. The method for producing a housing as claimed in claim 12, further comprising:
applying an outer layer to the sealing layer.

17. The method for producing a housing as claimed in claim 12, wherein the sealing layer is formed using a coating technique selected from the group consisting of a sol-gel operation, CCVD and PVD.

18. The method for producing a housing as claimed in claim 12, wherein silanes with functionalization selected from the group consisting of alkoxysilanes, aminosilanes, and acrylosilanes, are used for the sealing layer.

19. The method for producing a housing as claimed in claim 18, wherein silanes without functionalization selected from the group consisting of alkyltrialkoxysilanes are also used for the sealing layer.

* * * * *